United States Patent [19]

Hashimoto et al.

[11] Patent Number: 5,119,784
[45] Date of Patent: Jun. 9, 1992

[54] ENGINE CONTROL SYSTEM FOR MULTI-VALVE ENGINE

[75] Inventors: Noboru Hashimoto; Fumihiko Saito; Toru Shiraishi; Tatsuya Uesugi, all of Hiroshima, Japan

[73] Assignee: Mazda Motor Corporation, Hiroshima, Japan

[21] Appl. No.: 674,737

[22] Filed: Mar. 26, 1991

[30] Foreign Application Priority Data

Mar. 27, 1990 [JP] Japan ................... 2-78472

[51] Int. Cl.[5] ............................ F02M 39/00
[52] U.S. Cl. .................................... 123/432
[58] Field of Search ............ 123/432, 302, 308

[56] References Cited

U.S. PATENT DOCUMENTS

| | | | |
|---|---|---|---|
| 3,186,388 | 6/1965 | Bricout | 123/432 |
| 3,416,502 | 12/1968 | Weiss | 123/432 |
| 3,964,451 | 6/1976 | Goto | 123/432 |
| 4,114,371 | 9/1978 | Matsuda | 123/432 |
| 4,614,174 | 9/1986 | Tanigawa et al. | 123/432 |
| 4,834,048 | 5/1989 | Adamis et al. | 123/432 |
| 4,926,823 | 5/1990 | Kishi et al. | 123/432 |
| 4,955,347 | 9/1990 | Toyoda | 123/432 |

FOREIGN PATENT DOCUMENTS

| | | |
|---|---|---|
| 58-113512 | 7/1983 | Japan . |
| 61-215422 | 9/1986 | Japan . |
| 62-34124 | 2/1987 | Japan . |

*Primary Examiner*—David A. Okonsky
*Attorney, Agent, or Firm*—Fleit, Jacobson, Cohn, Price, Holman & Stern

[57] ABSTRACT

An intake system, for use with an internal combustion engine having a plurality of intake valves for each cylinder, includes a plurality of intake ports, opening into the combustion chamber side of the internal combustion engine at different distances from a spark plug of the cylinder. The intake valves are controlled to keep an intake port located at the shortest distance from the spark plug opened only slightly in an early intake cycle stage while opening the other intake ports at their desired timings. The intake port located at the shortest distance from the spark plug is subsequently opened at a desired timing, thereby aspirating a substantial quantity of air through the closest intake port at a later time than through the other intake ports.

6 Claims, 5 Drawing Sheets

ENGINE CONTROL SYSTEM FOR MULTI-VALVE ENGINE

The present invention relates to an engine control system for an engine, and more particularly, to an engine control system for a multi-valve internal combustion engine having at least two intake valves for each cylinder.

BACKGROUND OF THE INVENTION

1. Field of the Invention

Intake and exhaust performance of an internal combustion engine can be improved by increasing what is referred to as a "valve area". The term "valve area" refers to the total cross-sectional area occupied by intake and exhaust valves in a combustion chamber of each cylinder of the engine. For this reason, a multi-valve internal combustion engine is typically provided with more than one exhaust valve as well as a plurality of intake valves. To improve the output of such a multi-valve internal combustion engine, however, it is necessary for the intake and exhaust valves themselves to be small in size and light in weight so that they can follow actuating cam surfaces throughout a variety of speeds of rotation of the engine and, in particular, in a range of higher operating speeds.

2. Description of Related Art

One example of a three intake valve internal combustion engine is known from a Japanese patent application entitled "Four Cycle Engine," filed on Dec. 28, 1981, and published, as Japanese Unexamined Patent Publication No. 58-113512, on Jul. 6, 1983. This engine has the drawback that a reflux air stream is blown into a center intake port at the beginning of an intake stroke.

To eliminate the blowing of such a reflux air stream into the center intake port, leaving the center port closed at the beginning of an intake stroke was considered. In such an engine, however, another problem is caused, since gasoline, if discharged into the center intake port before or in an early stage of an intake stroke, will be trapped as fuel droplets in a throat of the center intake port. Such fuel droplets are, typically, difficult to sufficiently vaporize and spray into the combustion chamber. This results in deterioration of fuel combustion. Furthermore, in an engine having a spark plug installed at a center of each cylinder, fuel droplets stick to electrodes of the spark plug and smoke, so as to produce hydrocarbons (HC).

SUMMARY OF THE INVENTION

It is, therefore, a primary object of the present invention to provide an engine control system for a multi-valve internal combustion engine of the type having a plurality of intake ports, a specific one of which opens later than the other or others, in which no fuel droplets are trapped in the specific one of the intake ports.

This object is accomplished by providing an intake control system for introducing a fuel mixture into combustion chambers of cylinders of an internal combustion engine having a plurality of intake ports, intake valves and exhaust ports for one cylinder. These intake valves are driven by control means so as to maintain the intake port at the shortest distance from a spark plug slightly opened in early stage of an intake cycle of the cylinder while opening the other intake ports at a desired timing. This allows aspiration of air through the closest intake port later than through the other intake ports.

It is desirable to have the intake control system also suspend fuel delivery through the closest intake port until the internal combustion engine reaches a predetermined temperature.

The intake control system, thus constructed, allows fuel and air aspirated through the closest intake port, which is maintained slightly opened, to be sufficiently vaporized and sprayed in the combustion chamber, and improve fuel combustion efficiency, and results in preventing the accumulation of droplets of fuel, which in turn reduces smoking of a spark plug and generation of hydrocarbons (HC).

BRIEF DESCRIPTION OF THE DRAWINGS

The above and other objects and features of the present invention will be apparent to those skilled in the art from the following detailed description thereof when considered in conjunction with the accompanying drawings, in which similar reference numerals have been used to designate the same or similar elements throughout the drawings, and in which.

DETAILED DESCRIPTION OF THE PREFERRED EMBODIMENTS

Figure 1:
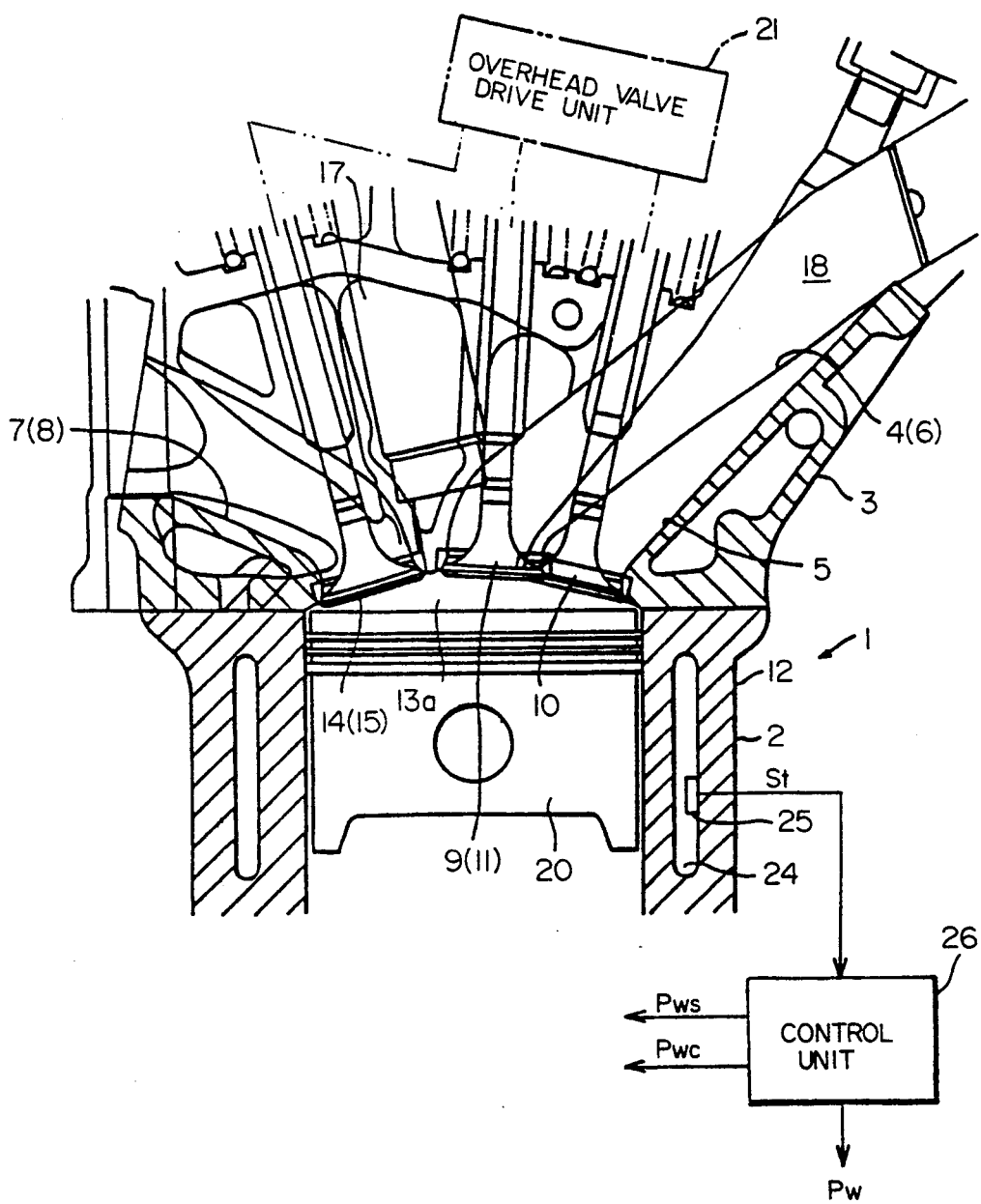
FIG. 1 is a cross-sectional view showing part of a multi-valve internal combustion engine equipped with an intake control system in accordance with a preferred embodiment of the present invention.
Figure 2:
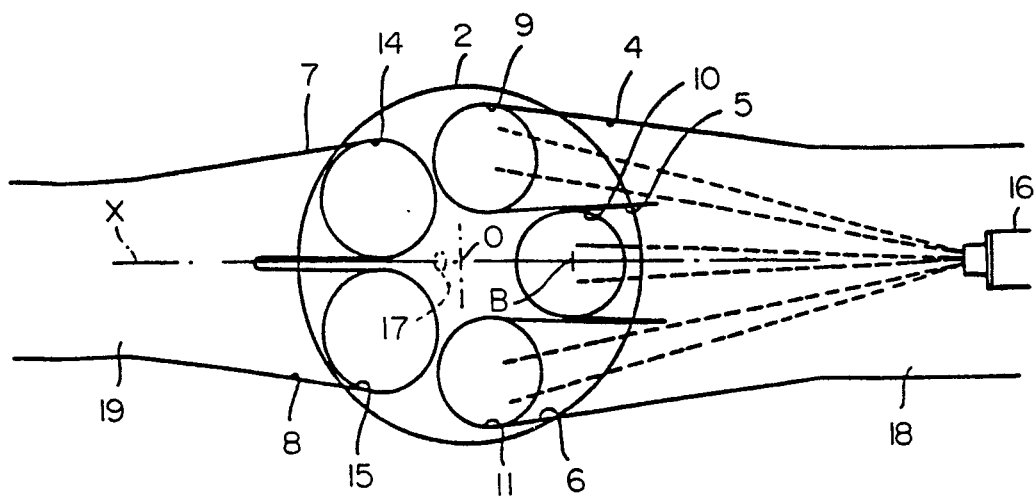
FIG. 2 is a schematic plan view of FIG. 1.

Referring to the drawings in detail and, in particular, to FIGS. 1 and 2, an internal combustion engine 1 with a control system in accordance with a preferred embodiment of the present invention is shown, and includes an engine block 2 and a cylinder head 3 mounted on the engine block 2. The engine block 2 is provided with a plurality of cylinders 12 formed with cylinder bores 13 (one of which is shown), each cylinder bore 13 receiving therein a piston 20 for reciprocating sliding movement. Combustion chamber 13a is formed in each cylinder 12 by the top of the piston 20, a lower wall of the cylinder head 3 and the cylinder bore 13. For each cylinder 12, the cylinder head 3 is formed with three, namely, first, second and third, intake ports 4, 5 and 6, having openings which extend toward one side of the engine 1. Further, for each cylinder 12, the cylinder head 3 is also formed with two, namely, first and second, exhaust ports 7 and 8, having openings which extend to another side of the engine 1. The intake ports 4, 5 and 6 and the exhaust ports 7 and 8 are opened and shut at a predetermined timing by the first, second and third intake valves 9, 10 and 11 and the exhaust valves 14 and 15. The first and third intake valves 9 and 11 are arranged adjacent to the second intake valve 10 and on opposite sides of and symmetrically with respect to a center line X passing through the center B of the second intake port 5 and the center 0 of the cylinder bore 13. In this sense, the second intake port 5 may be referred to as a center intake port, and both the first and third intake ports 4 and 6 may be referred to as side intake ports. All of intake ports 4, 5 and 6 merge and are joined together at a position near the combustion chamber 13a as an integrated intake port 18. In the integrated intake port 18 is provided a pulse controlled electronic fuel injector 16 so as to inject fuel uniformly into all the intake ports 4, 5 and 6. The exhaust ports 7 and 8 may merge and be joined together as an integrated exhaust port 19.

The cylinder block is provided with a spark plug 17 for each cylinder 12. Each spark plug 17 has its electrodes directed in a direction intersecting a line passing the center B of the center intake port 5.

Figure 3:
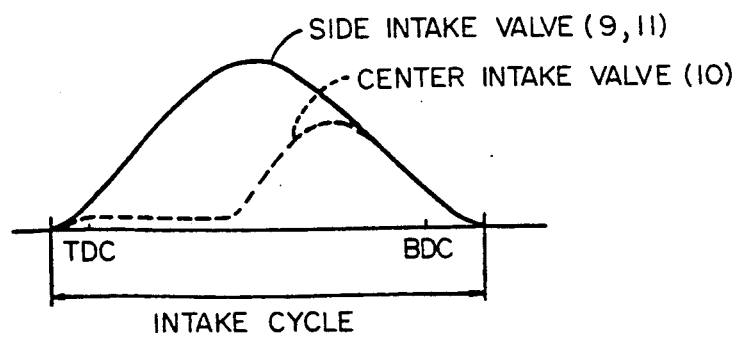
FIG. 3 is a time chart illustrating a timing at which three intake ports are opened and shut by intake valves.

Intake valves 9, 10 and 11 are driven by an overhead valve drive unit 21 specifically designed and adapted to open and close the intake ports 4 to 6 at a desired timing. Overhead valve drive unit 21 is diagrammatically shown in FIG. 3. Such an overhead valve drive unit 21 may be any known type of mechanism, such as one which typically includes at least an overhead cam, or a cam and push rod, and a rocker arm for each valve. The intake valves 9 to 11 are driven in such a way that the center intake valve 10 is delayed from opening, but advanced in closing, the center intake port 5 as compared to the times at which the side intake valves 9 and 11 open and close the side intake ports 4 and 7, respectively. In more detail, as is clear from a comparison of the solid and chained lines in FIG. 3, the overhead valve drive unit 21 pushes down the center intake valve 10 to provide a small valve lift at the beginning of an intake stroke and maintains it at the small valve lift so as to slightly open the center intake port 5 for a predetermined period of time, while the side intake valves 9 and 11 start their ordinary intake strokes. The small valve lift is determined so that only a small amount of fuel mixture is drawn into the combustion chamber 13a through the center intake port 5 for the predetermined period of time. After the predetermined period of time, the overhead valve drive unit 21 continuously pushes down and draws up the center intake valve 10 to gradually open and close the center intake port 5.

Maintaining the center intake port 5 slightly opened to such an extent that only a small amount of fuel mixture drawn into the combustion chamber prevents fuel mixture, drawn through the side intake ports 4 and 6, from being aspirated or blown, as a reflux stream, into the center intake port 5 in an early stage of the intake stroke. The center intake port 5, thus slightly opened, allows a slight amount of fuel mixture to be vaporized and sprayed into the combustion chamber 13a in an early stage of the intake stroke. This results in an improved fuel combustion in the early stage of the intake stroke.

Even though the center intake valve 1 is timed to maintain the center intake valve 5 slightly opened for a while in an early stage of the intake stroke, there is a chance that the electrode of the plug will smoke and produce hydrocarbon. It is, therefore, desired to particularly control fuel delivery into the combustion chamber 13a through the center intake port 5 when the cylinder is cold.

Figure 4:
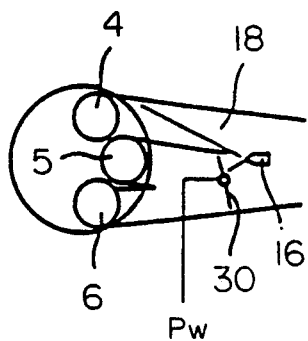
FIG. 4 is a schematic plan view illustrating another variant of a fuel delivery system of the multi-valve internal combustion engine of FIG. 1.

Referring to FIG. 4, for the purpose of controlling the amount of fuel delivered into the combustion chamber through the center intake port, a buffer, such as a pulse controlled shutter 30, is provided in the integrated intake port 18 downstream of the pulse controlled electronic fuel injector 16. The shutter 30 is controlled with a control signal Pw provided by a control unit 26 so as to alternatively shut off and allow fuel delivered by the fuel injector 16 into the center port 5 and one of the side intake ports 4 and 6 according to temperatures of the cylinder 12, while always allowing fuel delivered by the fuel injector 16 into the other of the side intake ports 4 and 6. Opening of the shutter 30 may be increasingly changed by the control unit 26 according to temperatures of the cylinder 12. The temperature of the cylinder 12 is represented by the temperature of engine coolant, such as cooling water, circulating through a water jacket 24 of the engine 1. The temperature of the coolant is detected by a temperature sensor 25, which itself is well known in the art. The control unit 26, when receiving a signal St from the temperature sensor 25, provides the shutter 30 with control pulses Pw.

When the cylinder 12 is too cold for the cooling water to reach a predetermined temperature Tp, the control unit 26 does not provide the shutter 30 with any control pulse. Therefore, the shutter 30 is not opened, causing fuel to be delivered into the combustion chamber 13a, not through the center intake port 5 and both of the side intake ports 4 and 6, but only through one of the side intake ports, e.g., side intake port 4.

Figure 5:
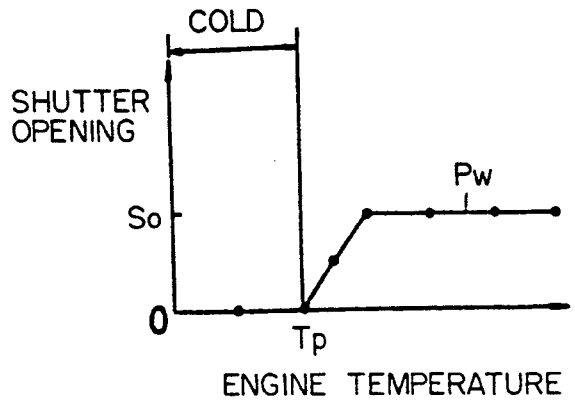
FIG. 5 is a diagram showing a correlation between shutter valve opening and engine temperature in the engine of FIG. 4.

As is shown in FIG. 5, as the temperature of cooling water reaches and goes beyond the predetermined temperature Tp, the control unit 26 provides the shutter 30 with a control pulse Pw, having a pulse width gradually increasing from zero (0), so as to gradually increase the opening of the shutter. This gradually increases the amount of fuel delivered into the combustion chamber 13a through the center and side intake ports 4 and 5. When the shutter 30 opens to its full open position So, fuel is delivered into the combustion chamber 13a uniformly through each of the center and side intake ports 4, 5 and 6.

Figure 6:
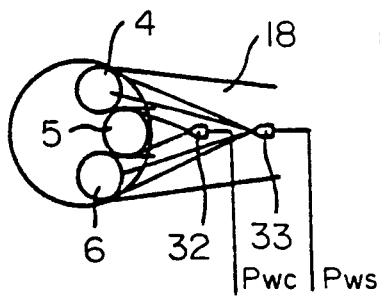
FIG. 6 is a schematic plan view illustrating a variant of a fuel delivery system of the multi-valve internal combustion engine of FIG. 1.

Alternatively, for the purpose of controlling the amount of fuel delivered into the combustion chamber through the center intake port 5, the integrated intake port 18 may be provided with an extra, or center, electronic fuel injector 32 for the center intake port 5 in addition to a twin nozzle side electronic fuel injector 33 having one nozzle for each of the side intake ports 4 and 6, as is shown in FIG. 6.

Typically, controlling the amount of fuel delivered by an electronic fuel injector is performed by controlling the width of a control pulse. As is well known, pulse width is a measure of how long the electronic injector is kept open. The wider the pulse width is, the longer the open time of the injector is. More fuel is delivered as the open time of the injector increases. The amount of fuel delivered by a given injector, therefore, depends upon the pulse width.

These electronic fuel injectors 32 and 33 are energized, or pulsed, to open by control pulses Pwc and Pws, which change in width according to cylinder temperature.

Figure 7:
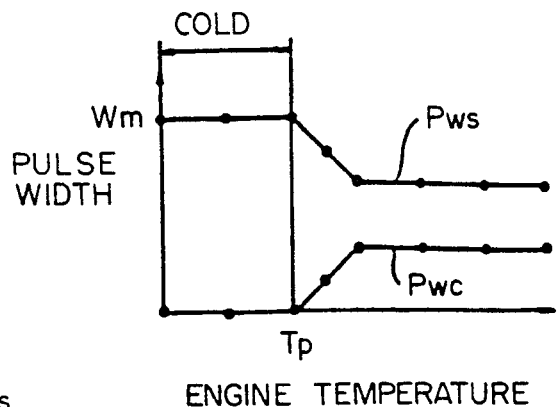
FIG. 7 is a diagram showing a correlation between injector pulse width and engine temperature in the engine of FIG. 6.

As is shown in FIG. 7, control pulses Pwc and Pws, supplied to the electronic fuel injectors 32 and 33, respectively, are changed by the control unit 26 according to temperatures of the cylinder 12. The control unit 26, when receiving a signal St from the temperature sensor 25, provides the electronic fuel injectors 32 and 33 with control pulses Pwc and Pws, respectively. When the engine 1, and in particular, the cylinder 12, is too cold for the cooling water to reach the predetermined temperature Tp, the control unit 26 provides the twin nozzle side electronic fuel injector 33 with a control pulse Pws having a maximum pulse width Wm, but does not provide the center electronic fuel injector 32 with any control pulse, so that no fuel is delivered by the center electronic fuel injector 32 into the combustion chamber 13a.

As the cooling water temperature reaches and rises beyond the predetermined temperature Tp, the control unit 26 provides the center electronic fuel injector 32 with a control pulse Pws having a pulse width gradually increasing from zero (0) so as to gradually increase the amount of fuel delivered by the center electronic fuel injector 32 into the combustion chamber 13a through the center intake port 5. The control unit 26, while continuing to provide the twin nozzle side electronic fuel injector 33 with the control pulse Pws, gradually decreasingly changes the control pulse Pws in pulse width from the maximum width Wm so as to gradually decrease the amount of fuel delivered by the twin nozzle side electronic fuel injector 33 into the combustion chamber 13a through the side intake ports 4 and 6.

Figure 8:
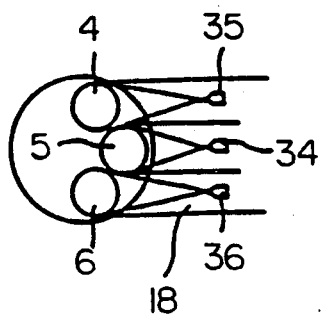
FIG. 8 is a schematic plan view illustrating still another variant of a fuel delivery system of the multi-valve internal combustion engine of FIG. 1.

Referring to FIG. 8, the intake ports 4, 5 and 6 may be provided, respectively, with separate electronic fuel injectors 34, 35 and 36. The center electronic fuel injector 35 for the center intake port 5 is not energized, or pulsed, until the cooling water reaches and rises beyond the predetermined temperature Tp.

Figure 9:
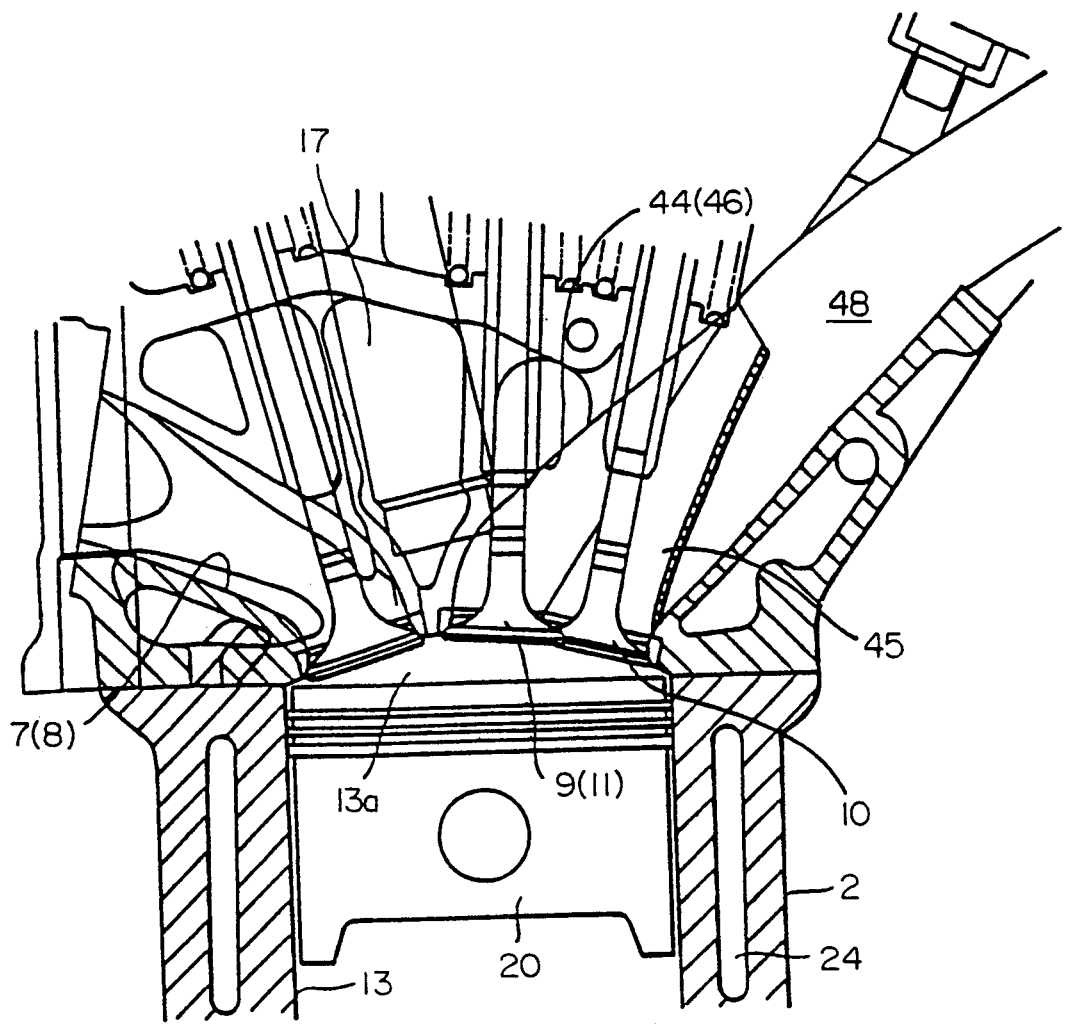
FIG. 9 is a cross-sectional view showing part of a multi-valve internal combustion engine equipped with an intake control system in accordance with another preferred embodiment of the present invention.
Figure 10:
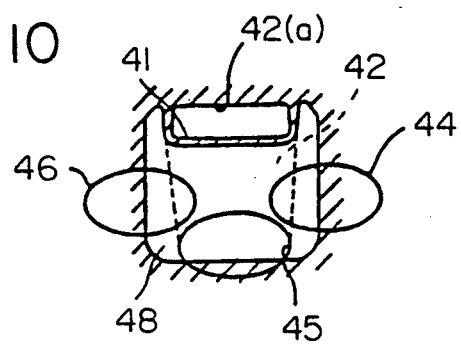
FIG. 10 is an explanatory illustration showing an integrated intake port of the intake control system of FIG. 9.

Referring to FIGS. 9 and 10, shown therein is an internal combustion engine 1 with a control system in accordance with another preferred embodiment of the present invention which has a different intake port arrangement from that of the previous embodiment. A cylinder head is formed, for each cylinder 13, with first, second and third intake ports 44, 45 and 46, having openings which extend toward one side of an engine 1. Further, each cylinder 13 of the cylinder head is formed with first and second exhaust ports 7 and 8, having openings which extend to another side of the engine 1. The intake ports 44, 45 and 46 and the exhaust ports 7 and 8 are opened and shut at a predetermined timing by first, second and third intake valves 9, 10 and 11 and exhaust valves 14 and 15. The first and third intake valves 9 and 11 are arranged similarly to valves 9 and 11 of the previously described embodiment on sides of the second intake valve 10, symmetrically with respect to the second intake port 45. All the intake ports 44, 45 and 46 merge and are joined together as an integrated intake port 48. The integrated intake port 48 is provided therein with a partition wall 41 which extends so as to cross obliquely the interior of the integrated intake port 48 and form an internal intake port 42, having an inlet 42a opening into the integrated intake port 48. The partition wall 48 communicates the second intake port 45 with the integrated intake port 48 separately from the first and third intake ports 44 and 46. The inlet 42a of the internal intake port 42 is formed by the partition wall 41 and the upper wall of the integrated intake port 48 at a position closer to the upper wall of the integrated intake port 48 than the lower wall, viewing FIG. 9, of the integrated intake port 48. A pulse controlled electronic fuel injector 49 is provided so as to deliver almost all fuel injected by the fuel injector 46 directly into the first and second intake ports 44 and 46 only, or to deliver fuel into the integrated intake port 48 at a location away from the inlet 42a of the internal intake port 42.

Second intake port 45, thus separated from the first and third intake ports 44 and 46 in the integrated intake port 48, does not introduce the injected fuel into the combustion chamber, or alternatively introduces sufficiently vaporized fuel mixture toward the electrode of the spark plug 17 in the combustion chamber 13a. As a result, the electrode of the spark plug 17 is prevented from smoking.

Figure 11:
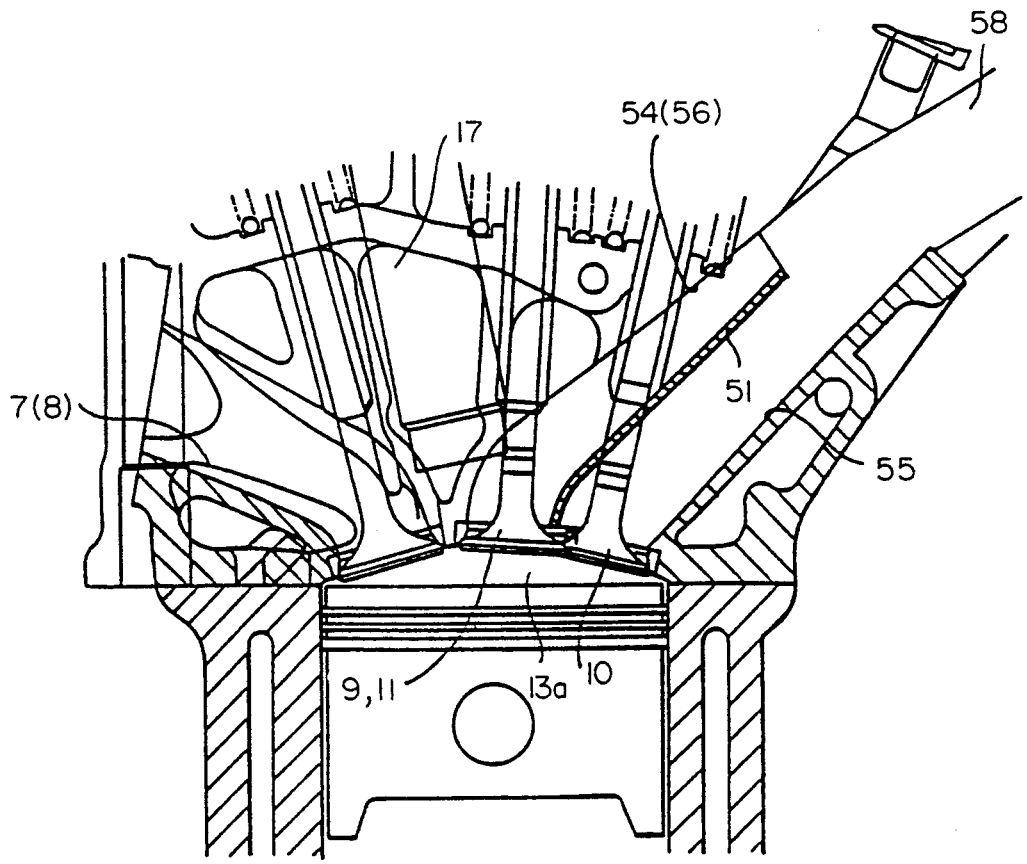
FIG. 11 is a cross-sectional view showing part of a multi-valve internal combustion engine equipped with an intake control system in accordance with another preferred embodiment of the present invention.
Figure 12:
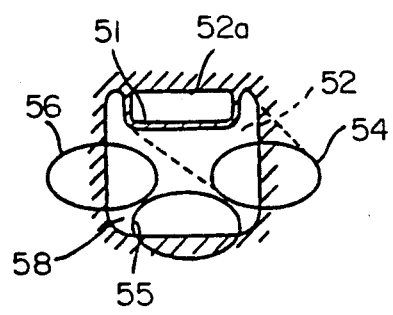
FIG. 12 is an explanatory illustration showing an integrated intake port of the intake control system of FIG. 11.

For an engine in which the generation of hydrocarbons (HC) is due to the presence of fuel droplets in a quench area rather than to smoking caused by a spark plug, an arrangement of intake ports shown in FIGS. 11 and 12 is more desirable. FIGS. 11 and 12 illustrate another embodiment of the present invention including an internal combustion engine 1 with a control system. In this embodiment, the arrangement of intake ports differs from that of the previous embodiment. A cylinder head 3 is formed, for each cylinder, with first, second and third intake ports 54, 55 and 56, each having an opening which extends toward one side of an engine 1. Further, the cylinder head 3 is formed, for each cylinder, with first and second exhaust ports 7 and 8, each having an opening which extends to another side of the engine 1. The intake ports 54, 55 and 56 and the exhaust ports 7 and 8 are opened and shut at a predetermined timing by first to third intake valves 9, 10 and 11 and exhaust valves 14 and 15. As in the previously described embodiments, the first and third intake valves 9 and 11 are arranged on sides of the second intake valve 10 symmetrically with respect to the second intake port 55. The intake ports 54, 55 and 56 are joined together as an integrated intake port 58. The integrated intake port 58 is provided therein with a partition wall 51 which extends so as to cross the interior of the integrated intake port 58 obliquely and form an internal intake port 52. Internal intake port 52 has an inlet 52a opening into the integrated intake port 58 so as to communicate the first intake port 55 with the integrated intake port 58 separately from the second and third intake ports 55 and 56. The inlet 52a of the internal intake port 52 is formed, by the partition wall 51 and upper wall of the integrated intake port 58, at a position closer to the upper wall of the integrated intake port 58 than the lower wall of the integrated intake port 58, viewing FIG. 11. A pulse controlled electronic fuel injector 59 is provided so as to deliver almost all of the fuel injected by the fuel injector 59 directly into the second and third intake ports 5 and 6 only, or to deliver fuel into the integrated intake port 58 at a location away from the inlet 52a of the internal intake port 52.

Figure 13:
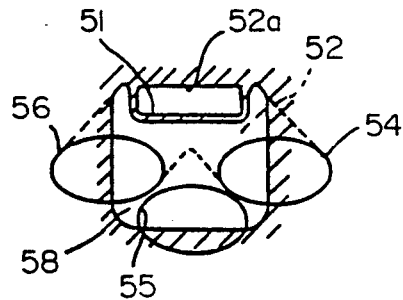
FIG. 13 is an explanatory illustration showing a variant of the integrated intake port of the intake control system of FIG. 11.

The internal intake port 52, having an inlet 52a opening into the integrated intake port 58, may be otherwise formed so as to communicate the first and third intake ports 54 and 56 with the integrated intake port 58 separately from the second intake port 55, as is shown in FIG. 13.

The intake ports, thus arranged, causes fuel delivered in the integrated intake port 58 by the injector to be introduced into the combustion chamber through the second intake port 55 only, or to be sufficiently vaporized before it is introduced into the combustion chamber 13a through all the intake ports 54 to 56. As a result, the generation of hydrocarbons (HC) due to fuel droplets in a quench area is effectively prevented.

It is to be understood that although the present invention has been described in detail with respect to preferred embodiments thereof, nevertheless, various other embodiments and variants are possible which are within the spirit and scope of the invention, and such other embodiments and variants are intended to be covered by the following claims.

What is claimed is:

1. An intake system for introducing a fuel mixture into a combustion chamber of a multi-valve internal combustion engine comprising:

at least two intake ports for each cylinder of said engine, said intake ports being arranged at different distances from a spark plug in each cylinder of said engine;

intake valves for opening and shutting each of said intake ports; and control means for driving said intake valves so as to maintain that intake port at the shortest distance from said spark plug opened only slightly in an early stage of an intake cycle of the cylinder while opening the other of said intake ports at a desired timing, thereby aspirating air through said intake port at the shortest distance from said spark plug at a later time than through the other of said intake ports.

2. An intake system as recited in claim 1, and further comprising fuel delivery control means for suspending fuel delivery through said intake port at the shortest distance from the spark plug before the internal combustion engine reaches a predetermined temperature.

3. An intake system as recited in claim 2, wherein said fuel delivery control means comprises at least two pulse controlled electronic fuel injectors, one for said intake port at the shortest distance from the spark plug and the other for the other of said intake ports, and a pulse controller for gradually decreasing a pulse width of a control pulse for said electronic fuel injectors for the other of said intake ports and gradually increasing a pulse width of a control pulse for said electronic fuel injector for said intake port at the shortest distance from the spark plug until the internal combustion engine reaches said predetermined temperature.

4. An intake system as recited in claim 2, wherein said fuel delivery control means comprises shutter means for opening and closing said intake port at the shortest distance from said spark plug and control means for causing said shutter means to close said intake port at the shortest distance from said spark plug before the internal combustion engine reaches a predetermined temperature and to gradually open said intake port at the shortest distance from said spark plug once said predetermined temperature has been reached.

5. An intake system as recited in claim 1, wherein said at least two intake ports are joined together as an integrated intake port and a fuel injector is disposed in said integrated intake port.

6. An intake system as recited in claim 5, wherein said integrated intake port is provided with an internal intake port therein at the shortest distance from said spark plug for separating said intake port from the other of said intake ports.

* * * * *